(12) United States Patent
Peitz et al.

(10) Patent No.: US 11,975,773 B2
(45) Date of Patent: May 7, 2024

(54) SENSOR DEVICE HAVING A PIVOT BEARING ARRANGEMENT

(71) Applicant: WESTFALIA-AUTOMOTIVE GMBH, Rheda-Wiedenbrück (DE)

(72) Inventors: Jürgen Peitz, Langenberg (DE); Kevin Stieben, Rietberg (DE)

(73) Assignee: WESTFALIA-Automotive GmbH, Rheda-Wiedenbrück (DE)

( * ) Notice: Subject to any disclaimer, the term of this patent is extended or adjusted under 35 U.S.C. 154(b) by 652 days.

(21) Appl. No.: 17/277,323

(22) PCT Filed: Sep. 16, 2019

(86) PCT No.: PCT/EP2019/074659
§ 371 (c)(1),
(2) Date: Mar. 18, 2021

(87) PCT Pub. No.: WO2020/064392
PCT Pub. Date: Apr. 2, 2020

(65) Prior Publication Data
US 2021/0347420 A1    Nov. 11, 2021

(30) Foreign Application Priority Data

Sep. 25, 2018   (DE) .................... 10 2018 123 644.1

(51) Int. Cl.
*B62D 53/10*      (2006.01)
*B62D 53/08*      (2006.01)
(52) U.S. Cl.
CPC ......... *B62D 53/10* (2013.01); *B62D 53/0842* (2013.01)
(58) Field of Classification Search
CPC .... B62D 53/08; B62D 53/0842; B62D 53/10; B62D 15/023; B60D 1/06; B60D 1/015; B60D 1/62; B60Y 2400/301
(Continued)

(56) References Cited

U.S. PATENT DOCUMENTS

| 2011/0181020 A1* | 7/2011 | Van de Wetering ... B62D 53/12 |
| | | 280/423.1 |
| 2015/0102583 A1 | 4/2015 | Reimer |

(Continued)

FOREIGN PATENT DOCUMENTS

| CN | 1174136 | 2/1998 |
| CN | 201446862 | 5/2010 |

(Continued)

OTHER PUBLICATIONS

The International Preliminary Report on Patentability for Application PCT/EP2019/074659 (Year: 2019).*

(Continued)

*Primary Examiner* — Minnah L Seoh
*Assistant Examiner* — Christopher B Wehrly

(57) ABSTRACT

A sensor device for a towing vehicle coupling with which a trailer vehicle is coupleable to a towing vehicle wherein the towing vehicle coupling has a coupling element for releasably coupling a coupling mating element, which elements are secured to the towing vehicle and the trailer vehicle, and when coupled rotate relative to each another about at least one joint rotational axis, forming a joint, wherein the sensor device has a follower which: is mounted on a bearing body such that it can rotate relative to the coupling element about a follower rotational axis; can be rotatably carried about the follower rotational axis by the rotation of the coupling mating element about the at least one joint rotational axis in order to sense a rotation of the coupling mating element relative to the coupling element about the at least one joint rotational axis, and wherein the sensor device has at least one sensor for sensing a respective rotational position of the follower relative to the bearing body in relation to the follower rotational axis.

38 Claims, 4 Drawing Sheets

(58) Field of Classification Search
USPC .................................................. 280/432, 433
See application file for complete search history.

(56) References Cited

U.S. PATENT DOCUMENTS

2017/0265373 A1  9/2017  Harnetiaux
2018/0057052 A1  3/2018  Dodd et al.

FOREIGN PATENT DOCUMENTS

| | | | |
|---|---|---|---|
| CN | 105984296 | 10/2016 | |
| CN | 107206856 | 9/2017 | |
| DE | 4021717 A1 | 1/1992 | |
| DE | 102010010242 | 6/2011 | |
| DE | 102016012663 | 6/2017 | |
| EP | 0433858 A2 | 6/1991 | |
| EP | 1886847 | 2/2008 | |
| EP | 2452839 | 5/2012 | |
| EP | 2719555 | 4/2014 | |
| EP | 2899101 | 7/2015 | |
| GB | 2470610 A | * 12/2010 | ............... B60D 1/58 |

OTHER PUBLICATIONS

Patent Cooperation Treaty (PCT), International Search Report and Written Opinion for Application PCT/EP2019/074659 filed Sep. 16, 2019, dated Dec. 6, 2019, International Searching Authority, EP.

* cited by examiner

SENSOR DEVICE HAVING A PIVOT BEARING ARRANGEMENT

CROSS-REFERENCE TO RELATED APPLICATION

This application is a 35 U.S.C. § 371 national stage application of PCT Application No. PCT/EP2019/074659 filed on Sep. 16, 2019, entitled "SENSOR DEVICE HAVING A PIVOT BEARING ARRANGEMENT," which claims priority to German Patent Application No. 10 2018 123 644.1 filed on Sep. 25, 2018, each of which are incorporated herein in their entirety by reference.

The invention relates to a sensor device for a towing vehicle coupling or forming part of a towing vehicle coupling, with which a trailer vehicle, in particular a semi-trailer, can be coupled to a towing vehicle, in particular a lorry, wherein the towing vehicle coupling has a coupling element for releasably coupling a coupling mating element, which elements are or can be secured to the towing vehicle and the trailer vehicle, and when coupled can rotate relative to each another about at least one joint rotational axis, forming a joint, wherein the sensor device has a follower which is mounted on a bearing body such that it can rotate relative to the coupling element about a follower rotational axis and be rotatably carried about the follower rotational axis by the rotation of the coupling mating element about the at least one joint rotational axis in order to sense a rotation of the coupling mating element relative to the coupling element about the at least one joint rotational axis, and wherein the sensor device has at least one sensor for sensing a respective rotational position of the follower relative to the bearing body in relation to the follower rotational axis. The invention also relates to a towing vehicle coupling with such a sensor arrangement.

Such a sensor device is described, by way of example, in EP 2 415 620 A1. The follower is designed as a ring which is rotatably mounted on the outer periphery of a coupling element designed as a ball head. In this case, the coupling mating element is a ball head receptacle, known as a ball socket, which is placed on the coupling ball, and thus the coupling element, and rotatably actuates the follower. Through the rotary bearing on the ball head the carrier has a degree of freedom of rotation about the follower rotational axis and thus detects an angular position of the trailer relative to the towing vehicle about a vertical axis or Z-axis. When coupling the coupling mating element to the coupling element, the follower is mechanically loaded.

It is therefore the object of the present invention to provide a sensor device which is improved in comparison with this.

To achieve this object, in a sensor device of the type mentioned above, the follower is movably mounted relative to the coupling element for providing or maintaining a follower coupling to the coupling mating element with a translational, in particular linear, degree of freedom of movement based on a pivot bearing arrangement, wherein the follower pivots about at least one pivot axis for an adjustment with the translational degree of freedom of movement. To achieve this object, a towing vehicle coupling is also provided with such a sensor device.

It is a basic concept that a pivot bearing is provided instead of a sliding bearing in order to movably mount the follower with a translational, in particular linear, freedom of movement. A pivot bearing has the advantage, for example, that it is much more mechanically robust. In addition, a pivot bearing is less prone to tension or jamming, which prevents the bearing body from moving relative to the towing vehicle coupling and thus impedes or even makes impossible the coupling between the carrier and the coupling mating element The translational movement can be a straight movement in a basic movement direction, but also a movement which also has a movement component or direction component transverse to the basic movement direction.

The translational degree of freedom of movement, preferably a plurality of or all translational degrees of freedom of movement, preferably enables or enable a straight translation. The translational degrees of freedom of movement can also allow superimposed displacement movements, in particular superimposed linear displacement movements, of the follower and/or of the bearing body relative to the coupling element.

In addition to the at least one translational degree of freedom of movement, however, it is advantageous if the follower is movably mounted with at least one rotational degree of freedom of movement relative to the coupling element, wherein the rotational degree of freedom of movement is different from the rotatability about the follower rotational axis.

A preferred concept provides that the follower pivots about at least two, preferably three or more pivot axes of the pivot bearing arrangement, for the adjustment and/or during the adjustment with the translational degree of freedom of movement. When providing two pivot axes, for example, a parallel adjustment is already possible in such a way that a follower surface with which the follower is in contact with the coupling mating element during operation of the sensor device is maintained.

A preferred concept envisages at least two pivot axes, preferably three or all pivot axes, of the pivot bearing arrangement being parallel to one another to provide the translational degree of freedom of movement.

In the case of adjustment with the translational or linear degree of freedom of movement, the follower is adjusted along a longitudinal axis. The longitudinal axis preferably runs transversely, for example perpendicular to the at least one pivot axis or the pivot axes of the pivot bearing arrangement.

It is understood that at least two, in particular a plurality of translational degrees of freedom of movement, preferably all translational degrees of freedom of movement, which the follower can have relative to the coupling mating element, can be realised by the pivot bearing arrangement or by a plurality of pivot bearing arrangements.

The translational degree of freedom of movement is understood here primarily and/or advantageously as a linear degree of freedom of movement or a degree of freedom of movement which allows at least one linear adjustment component or direction component. The linear degree of freedom of movement preferably comprises at least one linear movement component parallel to the follower rotational axis or runs parallel to the follower rotational axis.

An advantageous embodiment of the invention, but also a self-contained invention, namely in conjunction with features of the preamble of claim 1, is represented by the following measure:

Preferably, the follower is mounted exclusively by means of pivot bearings so as to move in relation to the coupling mating element. At least two pivot bearings are preferably present.

The pivot bearing arrangement expediently has at least one pivot bearing pivoting only about one axis of rotation.

The pivot bearing arrangement can also comprise at least one pivoting joint with multiple axes, e.g. a cardan joint, a ball joint or the like.

An equally advantageous embodiment of the invention, in conjunction with features of the preamble of claim 1, but also an independent invention, is represented by the following:

Preferably, the follower is movably mounted relative to the coupling mating element by means of at least one four-joint link/or a link parallelogram. By means of the four-joint link, the follower and/or the bearing body supporting the follower can for example be adjusted in the manner of a parallelogram relative to the coupling element. The four-joint link comprises, for example, joint rods on whose longitudinal end regions pivot joints, in particular joints pivoting in multiple axes, preferably ball joints, are arranged.

The four-joint link can, for example, be arranged on a pivot bearing such that the four-joint link itself, for example, provides one of the pivot axes, which realise a translational degree of freedom of movement, while the other pivot axis is provided by the pivot bearing.

A further advantageous embodiment of the invention, but also an independent invention with the features of the preamble of claim 1, is represented by when the sensor device has a magnet arrangement with at least one magnet for providing a magnetic attraction force acting on the follower in the direction of the coupling mating element, wherein it is provided that the follower is held exclusively or substantially by the at least one magnet when using the sensor device, i.e. in the operating state, on the coupling mating element. In addition, the bearing body is held by the magnet on the coupling mating element. The sensor is also held by the magnet on the coupling element. Thus, a physical unit comprising the sensor and the follower is held by the magnet on the coupling mating element.

An advantage here is that a relative position of the at least one sensor and the follower remains the same apart from the rotatability about the follower rotational axis. Thus, a detection range of the sensor relative to magnets is always the same.

However, it is possible for the follower and/or the bearing body to be subjected, in addition to the magnetic force, to another force from a spring or the like, in the direction of the coupling mating element. However, the force of the magnet is stronger than that, for example, of spring.

A further advantageous concept which, however, represents a separate invention in conjunction with features of the preamble of claim 1, envisages the bearing body being movably mounted with three translational or linear degrees of freedom of movement at an angle to one another and with two degrees of freedom of movement relative to the coupling element that differ from the rotatability about the follower rotational axis, and being fixed in relation to the follower rotational axis in a rotationally stable manner with respect to the coupling element. Thus, the bearing body can participate in all movements except the movement about the follower rotational axis. In order to provide the above-mentioned translational degrees of freedom of movement, and at least one translational degree of freedom of movement, a pivot bearing arrangement with a movement exclusively about pivot axes is preferably provided.

It is advantageous if the follower is movably mounted relative to the coupling element for providing or maintaining a follower coupling to the coupling mating element with at least one degree of freedom of movement different from the rotatability about the follower rotational axis, advantageously with a plurality of degrees of freedom of movement different from the rotatability about the follower rotational axis.

Advantageously, it is provided that the at least one degree of freedom of movement different from the rotatability about the follower rotational axis comprises at least one rotational degree of freedom and/or at least one linear degree of freedom of movement or degree of freedom of displacement.

It is advantageous if a displacement axis of the degree of freedom of displacement and a pivot axis of the at least one rotational degree of freedom intersect each other.

It is a basic concept here that the follower is mounted not only rotatable about the follower rotational axis relative to the coupling element, but also with one or more further degrees of freedom of movement, which differ from the rotatability about the follower rotational axis or the degree of freedom of rotation about the follower rotational axis. As a result, the follower can be brought into contact with the coupling mating element, for example a ball-and-socket coupling, as a floating contact.

The at least one degree of freedom of movement for providing the follower coupling or maintaining the same expediently comprises at least one linear degree of freedom of movement. So, by way of example, the follower can be mounted on the coupling element such that it can move relative or parallel to the follower rotational axis towards or away from this or relative to the coupling mating element. The displacement axis expediently runs parallel or at an angle of less than 90° to the follower rotational axis. The linear adjustment axis can also be pivotable about a rotational axis or pivot axis in the context of the at least one degree of freedom of rotation.

Preferably, it is provided that the follower is mounted such that it can be displaced relative to the coupling element along at least one displacement axis or linear axis, by way of example along a linear axis or displacement axis, which is coaxial or parallel to the follower rotational axis.

If the follower in addition to being rotatable about the follower rotational axis, is also mounted so that it can displace exclusively along a linear axis or displacment axis, it is preferably provided that it has a slide-on slope and/or at least one resilient or elastic component. The follower can then, by way of example, when coupling the coupling mating element to the coupling element, deviate along the linear axis or displacement axis and also yield transversely to the linear axis or displacement axis in order to enable or facilitate movement of the coupling mating element in contact with the follower so that the follower and the coupling mating element are or come into follower contact.

The bearing body is advantageously retained non-rotatably with respect to the follower rotational axis by means of an anti-rotation lock, which is provided for retaining the sensor device on the towing vehicle coupling.

It is furthermore advantageous if the follower has at least one follower surface lying outside the joint, in particular a frictional engagement surface, positive engagement surface or similar, for following by the coupling mating element. By way of example, the follower surface is arranged outside of the bearing surfaces of the coupling element and the coupling mating element with which the coupling element and the coupling mating element slide along one another. The follower surface is also advantageously arranged next to the coupling element and/or coupling mating element.

The bearing body which supports the follower about the follower rotational axis is, by way of example, mounted at a single bearing point on a component stationary relative to the towing vehicle coupling, by way of example a support body of the towing vehicle coupling, so that it can move relative to the at least one degree of freedom of movement, by way of example displace about a displacement axis and/or pivot or rotate about at least one pivot axis or rotational axis. This bearing point can lie in the axis line of the follower rotational axis or be coaxial with it. By way of example, the displacement axis can be coaxial with the follower rotational axis. However, it is also possible for this single bearing point to be eccentric to the follower rotational axis. Thus, by way of example, a bearing arm, from which the bearing body protrudes, can be mounted on a point of the towing vehicle coupling eccentric to the follower rotational axis.

However, it is also possible for the bearing body bearing the follower to be mounted movably on at least two, preferably at least three or four, bearing points on a component which is stationary relative to the towing vehicle coupling in relation to the at least one degree of freedom of movement. By way of example, rotary bearings and/or sliding bearings can be provided at the bearing points. By way of example, the bearing points are provided in corner regions of polygons, in particular of a triangle or quadrangle, between which the bearing body is arranged.

The sensor device preferably has an actuator for adjustment of at least the follower between a follower position adjusted closer to the coupling mating element and a release position further away from the coupling mating element, wherein the actuator can be actuated by means of a control device for adjustment of the follower. To achieve this object, a towing vehicle coupling is also provided with such a sensor device.

It is of course possible that not only the follower, but also the bearing body on which the follower is arranged, is adjusted between the follower position and the release position. In this case, it is possible that the actuator is only suitable and/or provided for adjustment from the release position to the follower position or from the follower position to the release position or for both.

Furthermore, the actuator can not only adjust the follower as such, but also for example the bearing body, if necessary also a sensor module, which comprises both the bearing body as well as the follower body and the sensor, between the follower position and the release position.

It is possible that the follower is removed from the coupling mating element in the release position, but also that it still has contact with the coupling mating element.

In any case, the mechanical load on the follower is reduced, for example during a coupling process, if it is held in the release position by the actuator, for example.

It is preferred if the control device for actuating the actuator is designed such that the actuator adjusts the follower between the release position and the follower position when the coupling element is in engagement with the coupling mating element, for example coupled or docked. Thus, for example, a king pin can first be introduced into a corresponding receptacle before the actuator moves the follower from the release position to the follower position. Conversely, it is also advantageous if the follower is moved by the actuator from the follower position to the release position as long as the coupling element is still engaged with the coupling mating element, i.e. the coupling is still present.

It is preferred if the follower is in contact with the coupling element in the follower position and in the release position except for contact with the coupling mating element. However, it is also possible that the follower has less force applied in the release position in the direction of the coupling mating element than in the follower position. It is then also possible for the coupling element and coupling mating element to be more easily disengaged or brought into engagement than if the follower is still in the follower position.

The actuator can for example have a positioning element for adjusting the follower and/or the bearing body between the follower position and the release position. It is therefore easily possible for the actuator to actuate only the follower by means of the positioning element, but also the follower and the bearing body, from the release position to the follower position or vice versa. The positioning element comprises for example one or a plurality of adjusting arms. It is preferred if the positioning element has at least one fork-like arm. Furthermore, the positioning element can be designed to reach under or reach behind the bearing body or follower.

After the adjustment of the follower or the bearing body, the positioning element is preferably adjustable into a rest position distant from the follower or the bearing body, in which the positioning element does not impede, or does so only to a lesser extent, mobility of the follower or the bearing body. For example, the bearing body or follower can move more freely with a degree of freedom of movement that is different from the rotatability about the driving axis of rotation when the positioning element is in the rest position.

It is preferred if the positioning element is out of engagement with the follower and/or the bearing body in the rest position. Consequently, it is advantageous if the follower is out of engagement with the follower or the bearing body in the rest position. However, it is possible for a supporting section of the positioning element to be out of engagement with the follower or bearing body, while a connection is still present with a flexible traction element between the positioning element and follower or bearing body such that the positioning element no longer impedes movement of the follower or bearing body itself, if necessary by coupling by means of the flexible traction element, for example a cable, a belt or similar. However, by means of the cable pull or belt, the positioning element can actuate the follower or bearing body for example from the follower position to the release position or vice versa.

The actuator includes for example an electric drive motor. However, a fluid drive, for example a compressed air drive, a spring drive or the like or combinations thereof are also easily possible. For example, a compressed air drive with integrated spring can be present which regularly transfers the follower or bearing body into the follower position. By actuating with compressed air or another fluid, the compressed air drive can be actuated from the follower position to the release position.

The actuator is preferably designed such that it permanently loads the follower and/or the bearing body by means of a spring arrangement in the direction of the follower position. However, it is possible for the spring arrangement to be deactivated, for example by electric motor or by another actuation such that the follower or the bearing body are actuated from the follower position to the release position. A deactivation device for deactivating the spring arrangement is for example advantageous, such that the follower can be adjusted from the follower position to the release position. The deactivation device comprises, for example, a manually and/or motorised, for example by an in particular electric drive of the deactivation device, actuatable or actuated holding element for holding the spring arrangement in a deactivation position assigned to the release position. The holding element can for example comprise a spring of the spring arrangement in a compression position as a deactivation position not loading the follower in the follower position.

The control device can be a mechanical control device. Thus, a mechanical actuation for triggering the actuator can be provided.

For example, the control device comprises a latching device or is formed by a latching device which actuates the actuator by actuating it to adjust at least the follower between the follower position and the release position. For example, the actuator is latched by means of the latching device so that it remains in the release position. When the latching device is actuated, it can release the actuator for an adjustment from the release position to the follower position.

For example, the latching device can be actuated by the coupling mating element and/or a locking device of the towing vehicle coupling. Thus, for example, a locking body, in particular a closing body or holding body, which holds the coupling mating element on the coupling element, can be provided for actuating the latching device.

The control device can, however, also comprise or be formed by an electrical control device for actuating the actuator. It goes without saying that a combination of mechanical actuation, for example latching, and electrical control is possible.

The control device expediently comprises at least one sensor, for example an optical sensor, a touch sensor, a capacitive sensor or the like, wherein the control device actuates the actuator by means of a sensor signal of the at least one sensor. For example, the sensor can be provided for detecting a relative position of the coupling mating element with respect to the coupling element. This means that when the coupling element and the coupling mating element are in engagement, this can be detected by the sensor, which activates the control device for controlling the actuator. Furthermore, it is possible for the sensor to be designed to detect a position of a locking device of the towing vehicle coupling. The sensor can thus, for example, control the actuator for adjustment from the release position to the follower position when the locking device is moved to the locking position. On the other hand, when the locking device of the towing vehicle coupling is released, it actuates the actuator for adjustment from the follower position to the release position.

The actuator is preferably connected to the bearing body for adjustment between the follower position and the release position by means of at least one flexible traction element, for example a belt, a cable or the like. The actuator can for example have a belt gear or a cable traction gear. The flexible traction element, for example, does not impede movement of the bearing body or follower even if it is free of force or loaded with little force.

The sensor is, by way of example, a magnetic sensor, a Hall sensor or similar. However, the sensor may also be an optical sensor, capacitive sensor, inductive sensor or similar. Combinations of different and/or physically differently detecting sensors are possible.

It is preferred if the follower is mounted on a bearing body separate from the coupling element so that it is rotatable about the follower rotational axis or if the bearing body is separate from the coupling element. The bearing body is suitable, by way of example, for retrofitting a pre-existing trailer coupling or towing vehicle coupling.

The coupling element comprises, by way of example, a coupling ball, a coupling recess or similar or is formed thereof. By way of example, a trailer coupling of a trailer can be attached to the coupling ball or to another positive-locking element. The coupling recess, by way of example a coupling jaw, is suitable for receiving positive-locking elements of the trailer coupling of the trailer or a semi-trailer, by way of example what is known as a king pin.

For supporting the follower relative to the degree of freedom of movement which differs from the rotatability about the follower rotational axis, a bearing device is advantageously provided. The bearing device can, by way of example, movably support the bearing body, on which the follower is mounted so that it can rotate about the follower rotational axis. The bearing device is arranged, by way of example, stationary on the towing vehicle coupling. Bearing surfaces of the bearing device are advantageously always in contact with each other in the manner of bearing surfaces or contact surfaces of a sliding bearing or rolling bearing.

The bearing device advantageously comprises at least one sliding bearing and/or one pivot bearing. A configuration is preferred in which a sliding bearing is integrated in a pivot bearing, i.e. by way of example, a sliding bearing element is slidably received in a pivot bearing element, which in turn is pivotally mounted on a pivot bearing recess. The pivot bearing receptacle may be stationary with respect to the coupling element. However, it is also possible that the sliding bearing element is stationary relative to the coupling element and the pivot bearing recess is arranged on a body on which the follower is mounted so that it can rotate about the follower rotational axis, by way of example, a carrier of a holding device to be described in the following, the bearing body or similar.

A sliding bearing body of the bearing device is preferably fixed by means of an elastomeric body to a stationary component of the towing vehicle coupling, so that the sliding bearing body is deflectable in at least one direction transverse to its sliding axis relative to the stationary component. The sliding bearing body comprises, by way of example, a bearing receptacle, a bearing axle body or similar, on which a further bearing body is mounted in a longitudinally displaceable manner with respect to the sliding axis. Thus, the sliding axis can tilt or pivot relative to the stationary component of the towing vehicle coupling, preferably for tolerance compensation.

It is possible for the follower to be mounted on a coupling carrier or coupling arm, on which the coupling element is arranged. The coupling carrier has, by way of example, a bearing recess or another bearing contour for the follower. The coupling carrier thus forms the bearing body or carries the bearing body.

An exemplary embodiment provides that the coupling element is a coupling ball and the coupling mating element is a coupling recess of a towing coupling of a trailer. The coupling element designed as a coupling ball expediently protrudes from a coupling arm or is arranged on a free end region of a coupling arm.

However, it is also possible for the sensor device to be arranged or arrangeable on what is known as a fifth-wheel coupling, in which the coupling element has a coupling recess, by way of example a coupling jaw for receiving a king pin of the coupling mating element. Thus, in this case, the receptacle is provided on the towing vehicle whereas the component engaging in the receptacle is present on the trailer vehicle. The coupling element advantageously has a coupling recess, in particular a coupling jaw, for receiving a king pin of the coupling mating element.

The bearing body is expediently annular or has ring sections. The bearing body may by way of example be arranged on the outer circumference of a coupling arm or on the inner circumference of a coupling recess.

Furthermore, it is possible for the bearing body to have a recess or passage opening for at least one coupling element carrier of the towing vehicle coupling, by way of example the coupling arm. The bearing body can also be multi-part, i.e. it has bearing body sections in order to support the follower. Consequently, the follower can be mounted on a plurality of bearing body parts or bearing body sections or a plurality of bearing bodies.

Furthermore, it is possible for the bearing body to comprise a bearing shaft or a bearing pin.

The follower preferably has means for a frictional and/or non-positive and/or magnetically adhesive grip on the coupling mating element.

Advantageously, it is provided that the coupling mating element can pivot relative to the coupling element about the follower rotational axis through a pivoting angle of at least 140°, preferably 160° or more preferably at least 180° or at least 220°.

The at least one degree of freedom of movement of the follower for providing or maintaining the follower coupling to the coupling mating element expediently comprises at least one degree of freedom of rotation for rotation of the follower about at least one rotational axis angled, by way of example at right angles, to the carrier rotational axis, or is formed thereof. It is preferred if there are two rotational degrees of freedom that are different from the follower rotational degree of freedom and serve as degrees of freedom of movement for providing or maintaining the follower coupling of the follower to the coupling mating element.

By way of example, the follower may be gimbal-mounted relative to the coupling element or on the coupling element. However, the cardan axes or gimbal axes are different from the follower rotational axis. By way of example, the follower is mounted on the bearing body so that it can rotate about the follower rotational axis, which in turn is gimbal-mounted relative to the coupling element.

It is also advantageous if the follower or the bearing body, which rotatably supports the follower relative to the follower rotational axis, is supported by at least one ball joint relative to the coupling element or on the coupling element.

The ball joint is preferably rotationally fixed against rotation relative to the follower rotational axis on the coupling element or relative to the coupling element. However, it is also possible that the ball joint is not freely movable relative to the follower rotational axis and relative to the coupling element, but by way of example is braked, by way of example by a friction brake or similar.

The follower is advantageously mounted so that it is movable relative to the coupling element for providing or maintaining the follower coupling to the coupling mating element with at least one degree of freedom of rotation different from the rotatability about the follower axis, allowing the deflection of the follower relative to the coupling element by a minimum of 3° or a minimum of 5° or at least 10° from a central position of the follower relative to the coupling element and/or a displacement of the follower relative to the coupling element of a maximum of 30°, advantageously a maximum of 20° or a maximum of 10° from a central position of the follower relative to the coupling element. The follower can be deflected from the central position with respect to the rotational axis different from the follower rotational axis, which may also be referred to as a pivot axis, to opposite sides by a maximum of 30°, in particular not more than 20° or not more than 10°. A deflection of the follower of more than this from the middle position is advantageously not necessary and/or not provided for.

A maximum total deflection ability of the follower about a rotational axis/pivot axis which is angled relative to the follower rotational axis is, by way of example, a maximum of 60°, a maximum of 40° or a maximum of 20°.

Preferably, the follower is arranged linearly immovably, but rotatable about the follower rotational axis, with respect to the bearing body, in particular with respect to the follower rotational axis. The linear immovability may be provided relative to one or more axes, in particular one or more rotational axes.

Advantageously, it can be provided that the follower is mounted on the bearing body so that it rotates exclusively about the follower rotational axis, but otherwise has no degree of freedom of movement relative to the bearing body.

Advantageously, it is provided that the follower is mounted exclusively rotatably on the bearing body.

The bearing body, however, can be mounted so that it is linearly displaceable relative to the coupling element, in particular parallel to the follower rotational axis. Thus, a linear displaceability of the follower relative to the coupling mating element is provided by the linear displaceability or a linear displaceability of the bearing body relative to the coupling element. The linear displaceability of the follower parallel to the follower rotational axis is preferably the only linear displaceability of the follower relative to the coupling element. The follower is otherwise not linearly displaceable, but is preferably rotatable through at least one degree of freedom of rotation, which is different from a rotation about the follower rotational axis.

Advantageously, it is provided that the follower is arranged outside a bearing region of the joint, in which the coupling element and the coupling mating element are in bearing engagement with one another.

It is also advantageous if the at least one sensor is arranged in an interior space of the follower and/or the follower forms a protective housing for the at least one sensor.

A basic concept here is that the sensor device is arranged in the outside area, i.e. directly on the coupling recess or the coupling jaw, wherein the follower simultaneously protects the sensor. The sensor is arranged by way of example in the interior of the follower or in a protective housing, which is formed by the follower.

Furthermore, the follower is not located directly in the bearing region of the coupling element and coupling mating element, so that retrofitting an existing towing vehicle coupling is easier. The bearing region is in the power train between the towing vehicle and the trailer vehicle and highly mechanically loaded and is not weakened by the follower. A receiving space or installation space for the follower is not necessary.

A preferred concept provides that the sensor is arranged, so to speak, completely encapsulated or protected in the protective housing or the follower.

The follower is advantageously designed in the manner of a protective cap or protective cover. The follower can, by way of example, form a kind of cover or cap, in the interior of which the at least one sensor, preferably a sensor device, is arranged.

It is advantageous that no special measures are necessary on the king pin or in any event the coupling of the semi-trailer. On the contrary, the follower of the sensor device according to the invention is designed and provided for rotational following or rotational coupling with the king pin.

The bearing body is arranged, or can be arranged, by way of example, on the coupling element of the towing vehicle. However, the bearing body can also be arranged on the coupling element or be formed by a section of the coupling element. So, by way of example, a bearing groove or a bearing projection, on which the follower is mounted, can be arranged on the coupling element of the towing vehicle coupling or fifth-wheel coupling.

However, an embodiment in which the bearing body is designed as a separate body from the coupling element is particularly preferred.

A preferred embodiment provides that the sensor device is designed and/or provided for an arrangement in a receiving space of the towing vehicle coupling which is present in the coupling recess, by way of example the coupling jaw. Advantageously, a geometric configuration of the sensor device is such that it can be arranged in the receiving space. The receiving space is located, by way of example, below the coupling recess or next to a support plate of the towing vehicle coupling. The receiving space can be configured, by way of example, as a cavity, recess or similar. It is preferred if the receiving space is, so to speak, present in any case, i.e. that an existing towing vehicle coupling can be retrofitted with the sensor device.

Also expedient is a holding device for holding the follower on an end face of the coupling mating element, in particular of the king pin. The holding device or a holding device can also be provided for attachment to opposite sides of the coupling recess. By way of example, the coupling recess is bounded by lateral sections of the coupling element. The holding device can be fixedly arranged or movably mounted on these lateral sections. By way of example, therefore, screws or other fastening means may be provided for securing the holding device to the coupling element.

It is possible for the holding device to have a holding body, in particular a holding plate, which extends below the receiving space or the coupling recess and, as it were, closes it from below in the manner of a lid.

The sensor device expediently comprises a holding device for holding the bearing body against rotation relative to the follower rotational axis of the bearing body on the coupling element. The bearing body itself is thus held in rotation relative to the coupling element by the holding device. In turn, the follower is mounted on the bearing body so that it can move about the follower rotational axis.

The sensor device is expediently fastened to the towing vehicle coupling by means of a fastening means. The fastening means comprises, by way of example, a screw means, a clamping means, a positive-locking contour or similar. Adhesion and/or welding as fastening means for fastening the sensor device to the towing vehicle coupling are also advantageous. Gluing and welding have the advantage that the structure of the towing vehicle coupling remains unchanged, by way of example, no holes or similar are necessary. For producing a welded joint between the sensor device and the towing vehicle coupling capacitor discharge welding is, by way of example, suitable. Furthermore, the sensor device can be connected to the ball coupling on the basis of at least one rivet. Furthermore, so-called welding bolts, in any case at least one welding bolt, can be used, i.e. bolts with which a component thereof is welded to the towing vehicle coupling.

Finally, a suction means, by way of example a suction head, is also suitable as a means of fastening. A suction head may for example be arranged, and/or provided, on the holding device and designed to suck the holding device onto a coupling arm or a surface next to a coupling recess of the towing vehicle coupling.

The holding device expediently comprises the abovementioned or a fastening means, by way of example a screw means, clamping means, a positive-locking contour or similar, for attachment to the coupling element or to the coupling element of the towing vehicle coupling. As a screw means, by way of example, one or more screws are provided. Clamping by means, by way of example, of clamping contours, a clamping projection or similar is also advantageous for attaching the holding device to the coupling element or adjacent to the coupling element of the towing vehicle coupling. However, gluing may also serve as a fastening means. A suitable positive-locking contour, by way of example, a support projection, a hook contour or similar, with which the holding device is to be positively secured to the towing vehicle coupling is suitable.

The holding device can serve to support the bearing body with at least one degree of freedom of movement suitable for providing or maintaining the follower coupling of the follower to the coupling mating element, which differs from the rotatability about the follower rotational axis, relative to the coupling element. By way of example, the holding device is gimbal-mounted with respect to the coupling element.

The holding device can, by way of example, form a bearing device for the bearing body, on which the follower is mounted rotatably about the follower rotational axis.

The holding device has, by way of example, a carrier, in particular a support plate, for the bearing body.

It is possible for the carrier to be releasably connected to the coupling element or a component of the towing vehicle coupling carrying the coupling element by means of said fastening means and/or a fastening device. The fastening device comprises, by way of example, a screw arrangement with one or more screws and/or a latching arrangement and/or a clamping arrangement or similar.

The carrier may be fixed or stationary relative to the coupling element.

The carrier is expediently movably mounted on the coupling element or relative to the coupling element.

In particular, in this case, it is possible for the bearing body itself to be firmly connected to the carrier, i.e. for the mobility of the bearing body through one or more degrees of freedom that are different from the rotatability about the follower rotational axis, to be exclusively or substantially provided by the holding device.

Furthermore, however, it is also possible for the bearing body to be movably mounted on the support with at least one degree of freedom of movement which differs from the rotatability about the follower rotational axis. In this case, the carrier may even be firmly connected to the coupling element of the towing vehicle coupling or to the coupling element of the towing vehicle coupling, whereas the mobility of the follower, apart from the follower rotational axis, is provided by a movable mounting of the bearing body on the carrier of the holding device.

It is preferred if the bearing body is mounted so as to be able to float with respect to the coupling element of the towing vehicle coupling, with the exception of a rotatability about the follower rotational axis, and/or with at least two degrees of freedom of movement. So, by way of example, the bearing body may be mounted to move about two mutually different pivot axes with respect to the coupling element, which differ from the follower rotational axis, in particular being angled to this.

On the bearing body, the follower is advantageously rotatably mounted on at least two pivot bearings, by way of example rolling bearings, in particular rolling bearings, ball bearings or similar, between which there is a spacing relative to the follower rotational axis. In the gap, by way of example, the at least one sensor or a sensor device can be arranged. The bearing concept with spaced pivot bearings enables optimal support of the follower on the bearing body. A tilting or other unfavourable position of the follower relative to the bearing body can be avoided or reduced by the two mutually spaced pivot bearings. As a result, the follower runs particularly easily relative to the bearing body.

Furthermore, it is advantageous for the follower to be rotatably mounted on mutually opposite longitudinal end regions of the bearing body relative to the follower rotational axis. By way of example, the follower is mounted on a free longitudinal end region as well as on a foot region of the bearing body with which it is connected to a further body, in particular the holding device or a holding device as mentioned above.

Even if only a single pivot bearing, but also if two or more pivot bearings is or are present between bearing body and follower, it is advantageous if the or all pivot bearings between bearing body and follower is or are designed as rolling bearings, in particular rolling bearings, ball bearings, needle rolling bearings or similar. As a result, the follower rotates particularly easily with respect to the bearing body, so that the following by the coupling mating element is easier to realise.

The follower expediently has an end face penetrated by the follower rotational axis, which is configured and/or provided for following by the coupling mating element. The end face is, by way of example, a frictional engagement surface, a surface with positive-locking contours or similar. Thus, the end face serves for frictional or positive following by the coupling mating element. However, the end face is also suitable for optimum following if magnetic adhesion is provided and/or if the follower is loaded by a spring arrangement in the direction of a following contact with the coupling mating element, which will become clearer subsequently.

The end face is expediently designed as a plane surface or has a plane surface.

The end face and a follower surface on a front side of the coupling mating element advantageously rest on one another in the follower position, in particular flat against one another.

The end face of the follower is advantageously in the follower position for contact on the or a follower surface, which is provided on a front side of the coupling mating element opposing the follower, and is exclusively in contact through such surface sections with the follower surface, the normal direction of which is parallel to the follower rotational axis. For example, the end face of the follower and the front side of the coupling mating element are respectively flat surfaces, which correspondingly only rest against one another in their respective normal direction. However, it is also possible for the end face of the follower or the follower contour of the coupling element to have an undulating contour or grooved contour. The respective apexes of the undulations or grooves are in contact with the follower surface of the coupling mating element.

Advantageously, the follower has an end face penetrated by the follower rotational axis, which is designed and/or provided for exclusively frictional and/or magnetic following by a follower surface on a front side of the coupling mating element.

A front side of the follower traversed by the follower rotational axis expediently has at least one ring or is formed by a ring. Needless to say, on the front side on the one hand an end face, on the other hand also a ring, may be present which, by way of example, engages with an outer periphery of the coupling mating element or can come into contact with its front side with an outer periphery of the coupling mating element. The ring can be designed, so to speak, as an annular projection in front of an end face, which is also provided for frictional, form-fitting or other follower coupling with the coupling mating element.

The follower advantageously has at least one inclined surface, in particular an insertion bevel, a conical surface or similar, along which the coupling mating element can slide when coupling to the towing vehicle coupling. Such an inclined surface can, by way of example, be configured or provided as a conical inclined surface between on the one hand the aforementioned end face or plane surface and on the other hand an outer circumference of the follower.

The sensor device preferably has a force-applying means or a plurality of force-applying means for applying a force to the follower in the direction of the coupling mating element. Therefore, the follower is subjected to force towards the coupling mating element, which facilitates or improves the follower coupling.

Preferably, the sensor device has a spring arrangement for providing a spring force acting on the follower in the direction of the coupling mating element. The spring arrangement may comprise one or more springs, in particular metallic springs, helical springs, coil springs or similar.

However, the spring force can also be provided or supported in whole or in part by a certain elasticity of a follower body of the follower. A combination of springs separate from the follower, in particular metallic springs, spring buffers or similar, with an elastic or spring-elastic follower body of the follower is easily possible.

At this point it should be mentioned that the follower advantageously has at least one elastic section for elastic deformation by the coupling mating element. Thus, by way of example, the force can be applied by a spring, a magnet or similar in the direction of the coupling mating element. The elastic section then yields. The follower is therefore advantageously elastically deformable or at least partially elastically deformable by the coupling mating element.

Furthermore, it is advantageous if the sensor device has a magnet arrangement for providing a magnetic attraction acting on the follower in the direction of the coupling mating element. The magnet arrangement may comprise one or more magnets which cooperate, by way of example, with the in itself ferromagnetic coupling mating element.

The magnet arrangement may comprise permanent magnets and/or electromagnetically acting magnets. By way of example, the magnet arrangement comprises one or more electrical coils.

The magnet arrangement may have one or more flux-conducting elements for guiding the magnetic flux which a permanent magnet or electromagnet of the magnet arrangement generates. By way of example, such a flux conducting element, in particular a soft magnetic flux conducting element, is configured and provided for directing or guiding the magnetic flux in the direction of the coupling mating element. The flux guide element is suitable, by way of example, for reinforcing or aligning a force of attraction of the follower in the direction of the coupling mating element.

The magnet arrangement can be configured or arranged for the actuation and excitation of the at least one sensor. Therefore, the magnet arrangement is used twice, as it were, namely for the generation of the force of attraction in the direction of the coupling mating element, but also for the excitation or actuation of the at least one sensor.

Furthermore, however, it is also possible for the magnet arrangement to have a screening device for screening the at least one sensor from magnetic influences of the magnet arrangement. Thus, by way of example, the magnetic field of the magnet arrangement can be directed away from the sensor or around the sensor. It should be mentioned at this point that a combination of magnetic screening and magnetic actuation of the sensor is also possible. By way of example, conduction of the magnetic flux or magnetic field of the magnet assembly may occur around a section of the sensor at another point in order to avoid faulty actuation while still directing the magnetic field towards the sensor.

On the follower at least one frictional engagement surface for a frictional contact with the coupling mating element and/or at least a form-fitting contour for a positive engagement of the coupling mating element and the follower one inside the other is expediently provided or arranged. The frictional engagement surface may include, by way of example, a rubber surface or similar.

Advantageously, the follower is designed exclusively for frictional rotational following by the coupling element or for frictional contact with the coupling mating element. In particular, the follower preferably has only one frictional engagement surface, for example an end face, for frictional contact with the coupling mating element. The follower advantageously has no positive-locking contour for positive-locking rotational following by the coupling mating element.

The follower may have a follower ring or annular section. Several part-rings, which are coupled or connected together, may also be present in the follower. An annular or partially annular peripheral follower contour in the follower is also advantageous.

The follower expediently has a dome-shaped or tower-like follower body. The follower body can be configured by way of example in the manner of a hood or a cover.

The follower expediently forms a protective housing or a cover for the at least one sensor.

It is also advantageous if the follower forms a protective housing for a bearing body supporting the follower, such as a bearing shaft or similar.

The at least one sensor and/or a bearing body which supports the follower around the follower rotational axis, by way of example a bearing shaft, is preferably arranged, in particular completely arranged, in an interior space of the follower. However, a partial arrangement of the at least one sensor or the bearing body in the interior of the follower is also possible. Thus, by way of example, the follower can overlap an end region of the bearing body, in particular a bearing shaft. The at least one sensor and/or the bearing body are arranged, by way of example, below an end wall or ceiling wall and in a wall of the follower interior delimited by a peripheral wall.

The sensor device expediently comprises at least one sensor or sensor transmitter mounted rotatably about the follower rotational axis, in particular a ring comprising an arrangement of a plurality of sensors or sensor transmitters. The rotatably mounted sensor or sensor transmitter is rotatably coupled or rotationally connected to the follower. Therefore, when the follower rotates about the follower rotational axis, it carries with it the at least one sensor or sensor transmitter.

It is also advantageous if the sensor device has a ring arrangement of a plurality of sensors or sensor transmitters arranged about the follower rotational axis. A "counterpart" to the respective sensor or sensor transmitter, that is to say a sensor transmitter for the sensor and a sensor for the sensor transmitter, is expediently arranged in a stationary manner relative to the follower rotational axis. By means of the ring arrangement of a plurality of sensors, or sensor transmitters, which are rotatable in particular about the follower rotational axis, an optimum resolution of the angle signal, generated by the sensor device when the follower rotates about the follower rotational axis, is possible.

The joint rotational axis, which corresponds to the follower rotational axis, is expediently a vertical axis and/or a substantially vertical rotational axis.

It is possible for the joint rotational axis and the follower rotational axis to be coaxial and/or aligned with one another when the coupling element and the coupling mating element are coupled to one another.

However, a transverse distance between these two rotational axes is also possible. It is at least advantageous if the joint rotational axis and the follower rotational axis run parallel to each other, when the coupling element and the coupling mating element are coupled to each other.

An advantage of the invention is if or when the sensor device is arranged on the towing vehicle, while the trailer vehicle is the passive device that operates the sensor device. The trailer vehicle does not need to be modified.

The sensor device may be provided for retrofitting towing vehicles, i.e. the towing vehicle coupling is to be retrofitted with the sensor device, e.g. by gluing, welding, clamping or similar.

Furthermore, it is possible that the towing vehicle coupling and/or the coupling of the trailer vehicle, which has the coupling mating element, is not or does not need to be changed mechanically. In particular, components of the towing vehicle coupling and the coupling of the trailer vehicle provided in the power train or for power transmission between the towing vehicle and the trailer vehicle remain unchanged, by way of example the regions of the coupling element and the coupling mating element which engage in one another and form the joint, and/or a locking device of the towing vehicle coupling or coupling of the trailer or similar.

It is advantageously provided that a locking technology or locking device of the towing vehicle coupling or the coupling of the trailer vehicle does not have to be modified.

Exemplary embodiments of the invention are explained below using the drawings, wherein.

Figure 1:
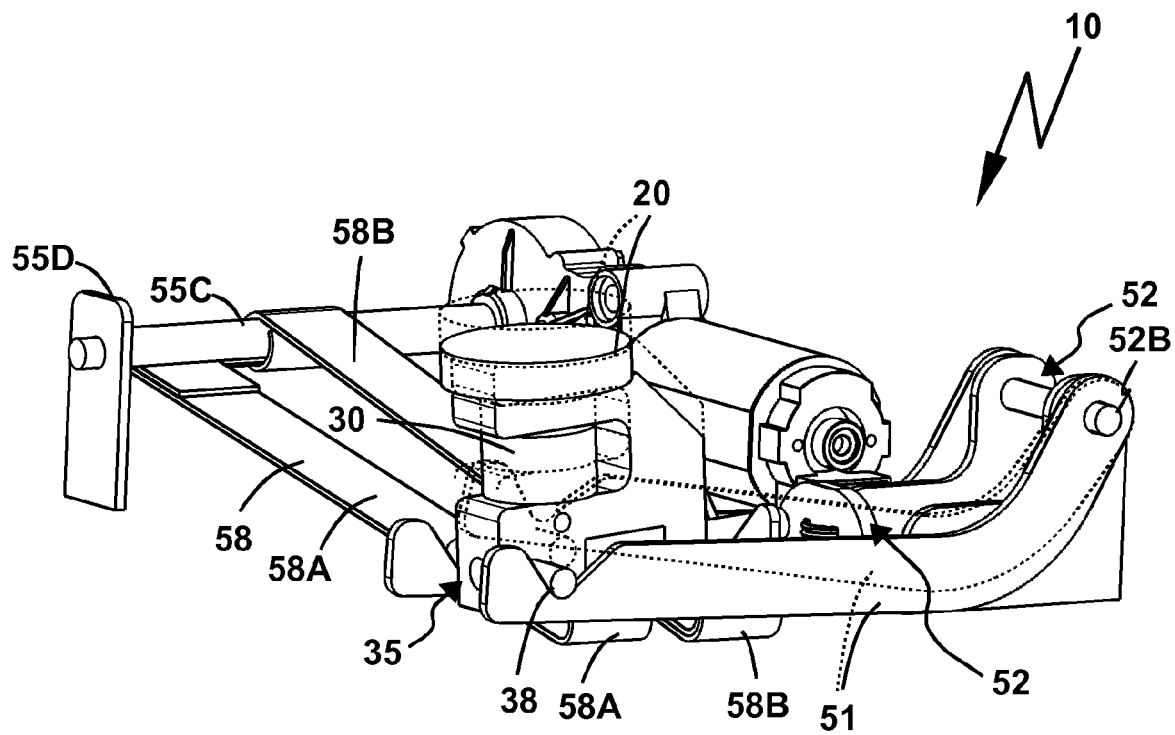
FIG. 1 shows a perspective side view of a sensor device with an actuator.
Figure 2:
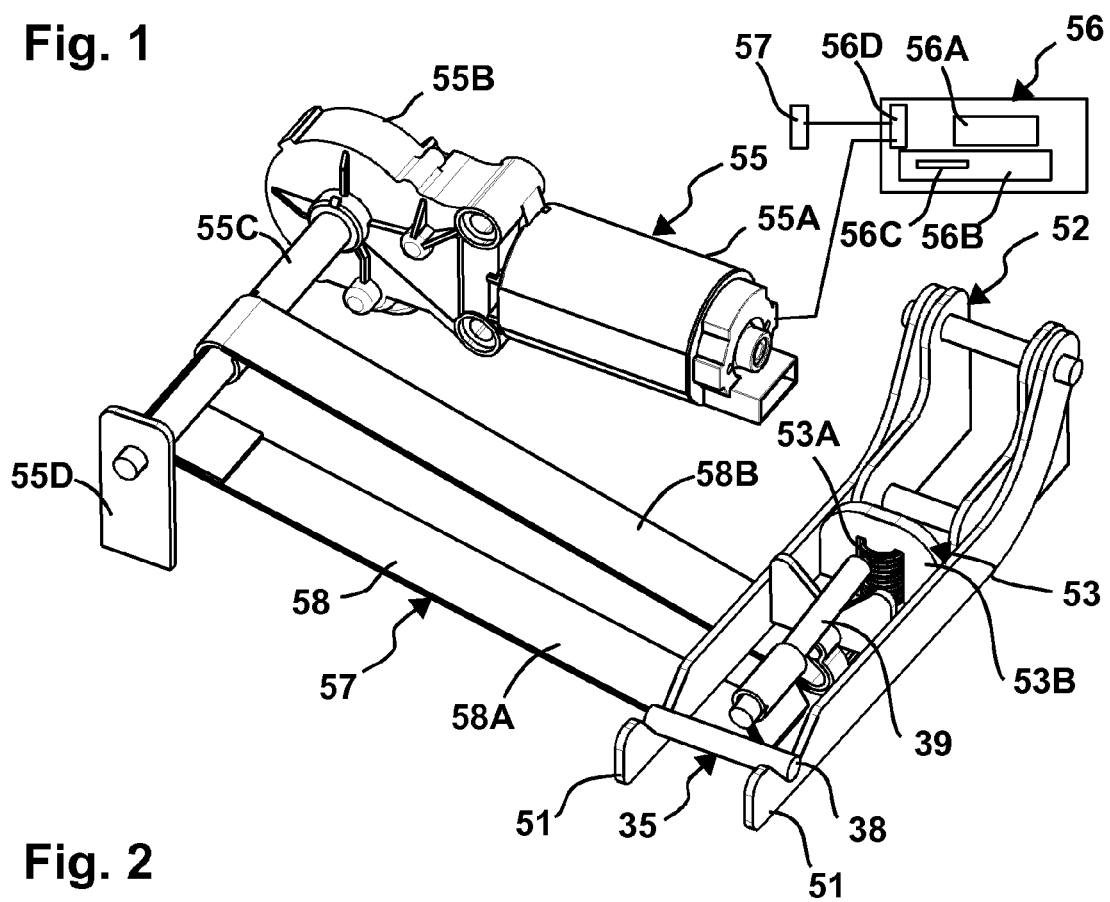
FIG. 2 shows the arrangement according to FIG. 1 diagonally from above.
Figure 3:
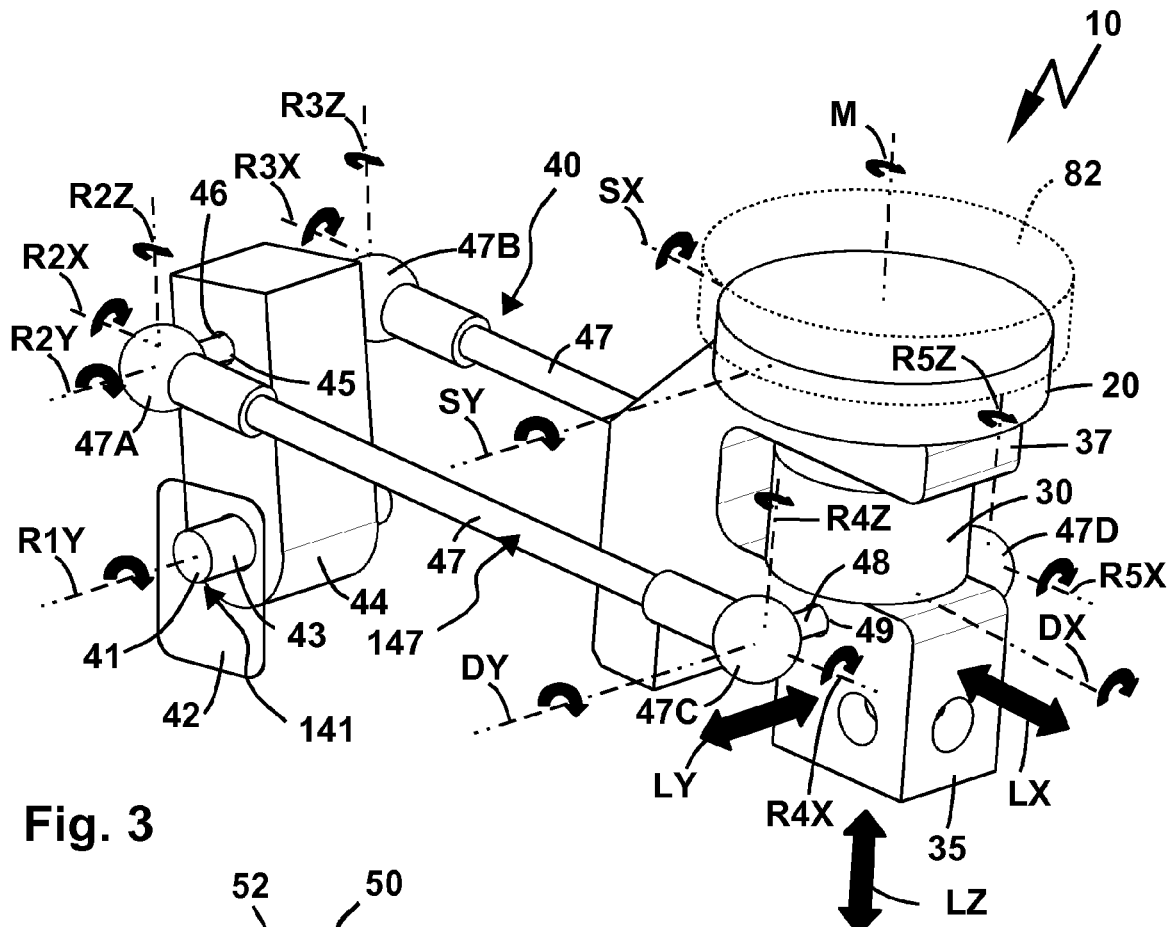
FIG. 3 shows the sensor device with its holding device.
Figure 4:
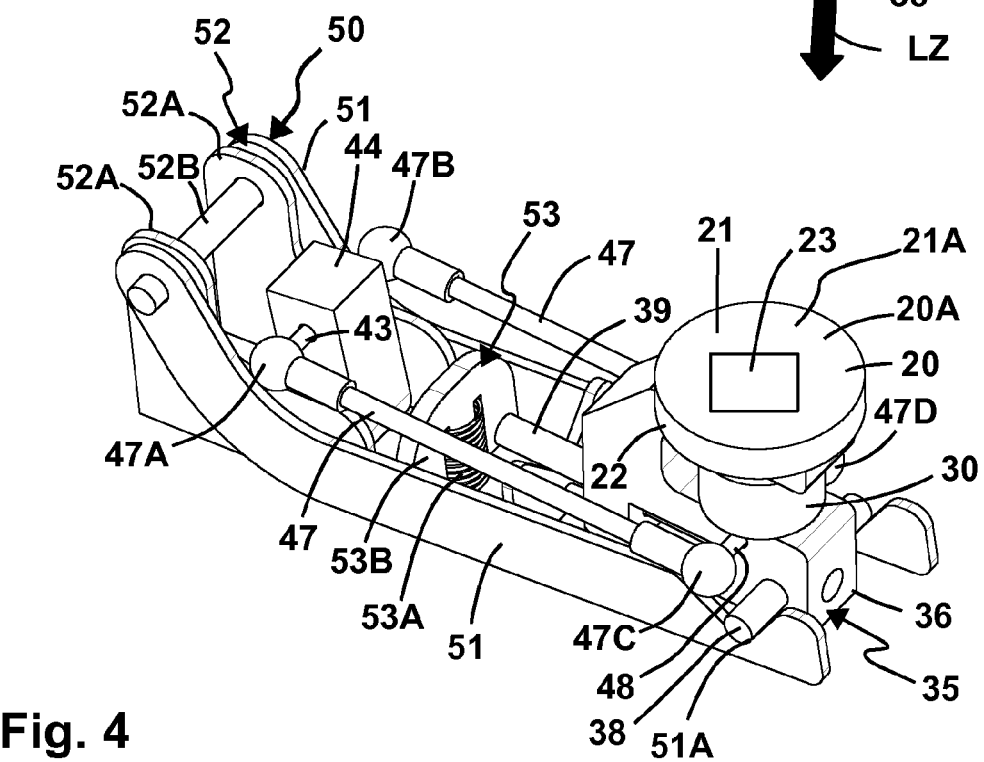
Figure 5:
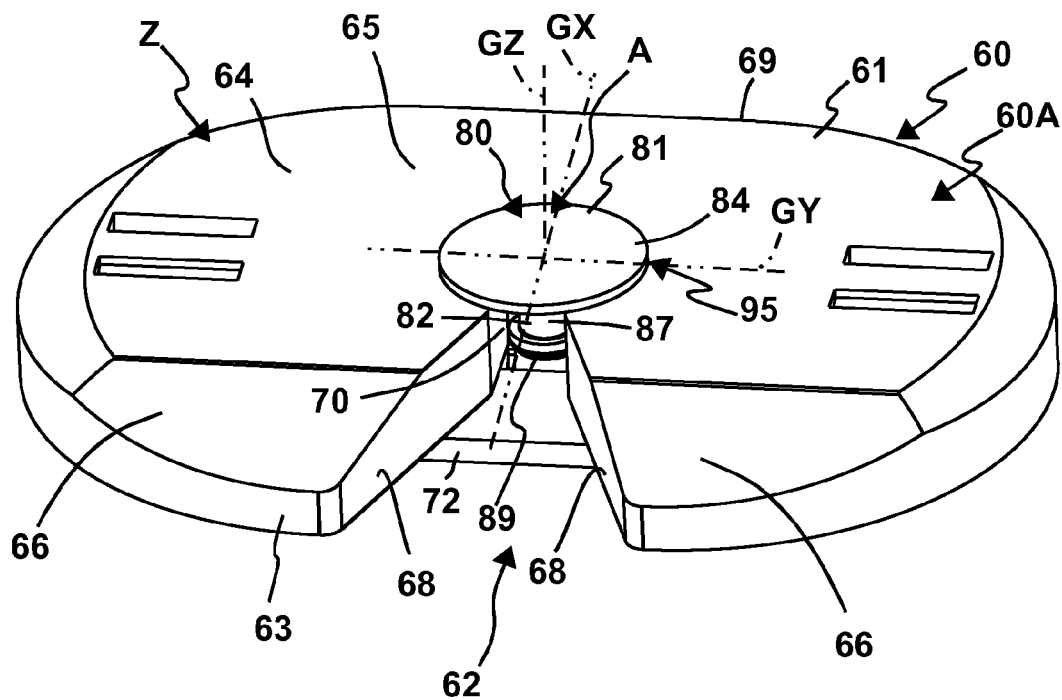
Figure 6:
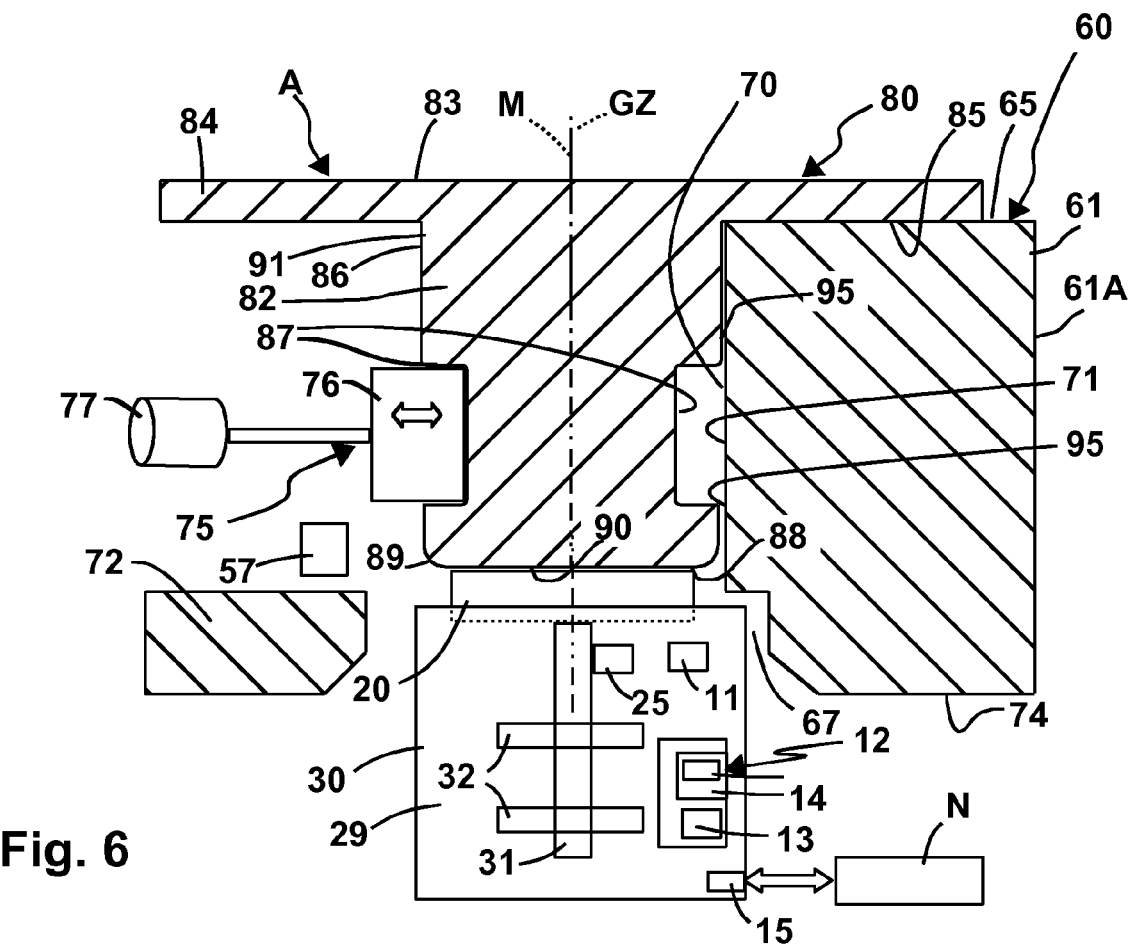
Figure 7:
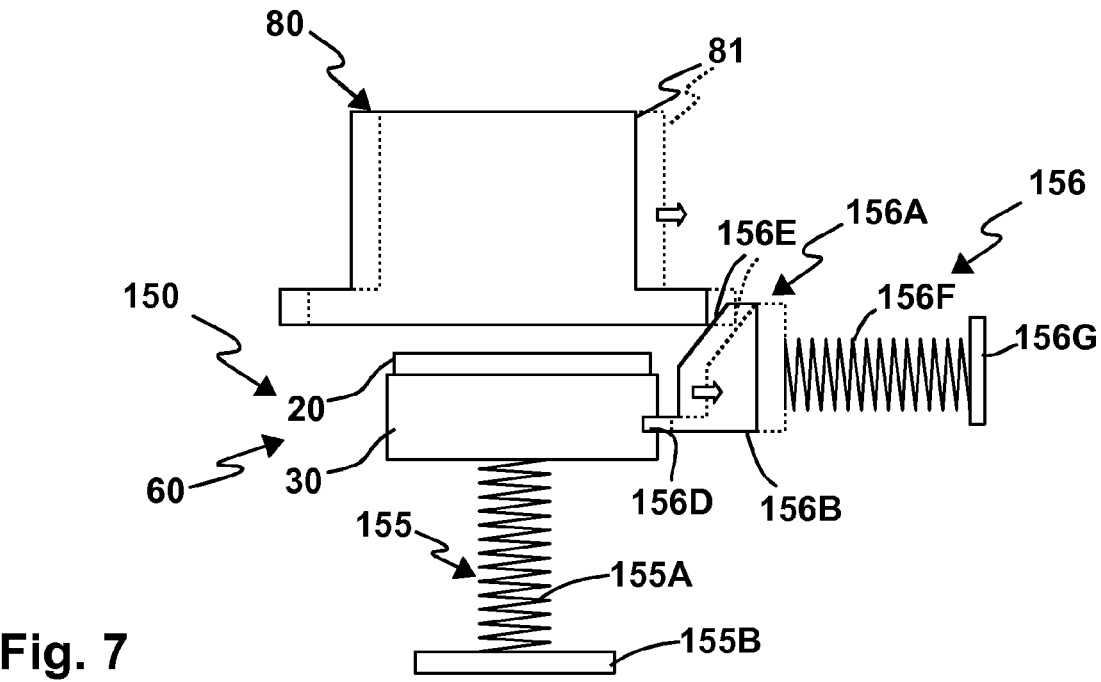
Figure 8:
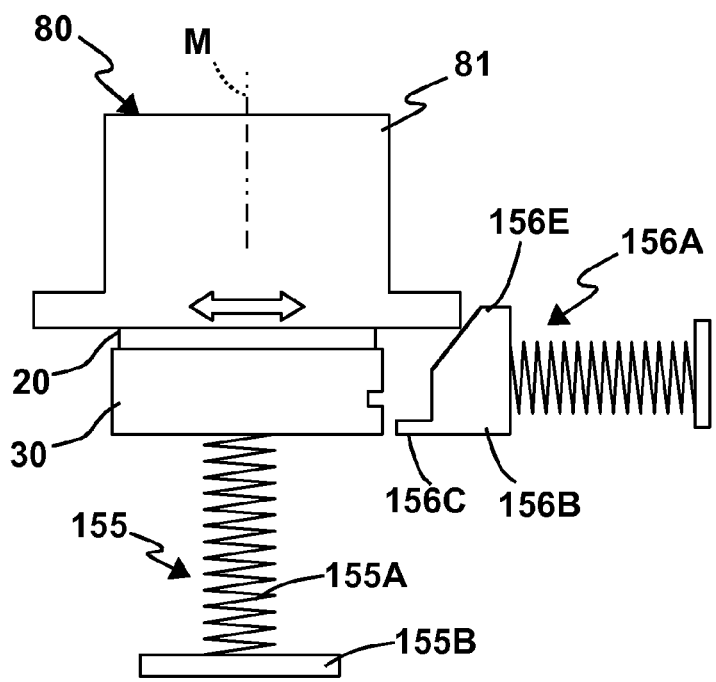

FIG. 4 shows the sensor device according to FIG. 3 with positioning elements of the actuator according to FIGS. 1, 2, FIG. 5 shows a perspective diagonal view of the towing vehicle coupling of FIG. 1 diagonally from above, wherein the trailer coupling is coupled to the vehicle coupling, FIG. 6 shows a sectional view through a follower of the sensor device shown in FIG. 5, approximately along a line of intersection along an axis GX, FIG. 7 shows a schematic view of a sensor device with an actuator with a control device in the form of a latching device in the release position, FIG. 8 shows the arrangement according to FIG. 7 in the follower position In the exemplary embodiments explained below, components are partly similar or identical in their functionality. In that regard, reference numerals are used which are different by 100 or also in some instances identical.

A towing vehicle coupling 60 is configured as a fifth-wheel coupling 60A. The fifth-wheel coupling 60A has a coupling element 61 in the form of what is known as a mounting plate 61A. On the mounting plate 61A, and thus on the coupling element 61, an insertion recess 62 is provided, which can also be referred to as an insertion opening. The insertion recess 62 facilitates the insertion of a coupling mating element 81 of a trailer coupling 80, which has what is known as a pin 82 or a king pin 82. The pin 82 is used to couple the trailer coupling 80 with the towing vehicle coupling 60.

The towing vehicle coupling 60 is or can be arranged on a towing vehicle Z. The towing vehicle Z is, by way of example, what is known as a semi-trailer or another truck.

By contrast, the trailer coupling 80 is or can be fastened to a trailer A, by way of example what is known as a semi-trailer.

For coupling the trailer coupling 80 to the towing vehicle coupling 60, the king pin or pin 82 is brought, by way of example, from a rear side of the towing vehicle Z or from an end face 63 of the coupling element 61 to the coupling element 61, wherein in practice the towing vehicle Z moves backwards to couple the semi-trailer and thus the trailer vehicle A.

The trailer vehicle A is supported on an upper side 83 of the trailer coupling 80 or the pin 82. The upper side 83 is connected, by way of example, to an underside of the trailer vehicle A, by way of example, welded or screwed.

The upper side 83 is provided on a flange body 84, the underside of which facing away from the upper side 83 forms a support surface 85 for supporting on the towing vehicle coupling 60. The support surface 85 serves to rest on a bearing surface 65 on the upper side 64 of the mounting plate 61A or the coupling element 61. The bearing surface 65 and the support surface 85 are preferably flat surfaces. Therefore, the trailer coupling 80 is supported over a large area on the bearing surface 65 in a horizontal plane, so that substantial supporting forces do not act on the actual king pin 82, which for instance engages with a pin section 91 in a coupling recess 70 of the towing vehicle coupling 60.

On the end face 63 a slide-on slope 66 is arranged, onto which the support surface 85 can slide when coupling the trailer coupling 80 to the towing vehicle coupiing 60. The insertion of the king pin 82 into the coupling recess 70 is facilitated by insertion bevels 68, which laterally delimit the insertion recess 62 and extend towards the coupling recess 70 in the direction of a narrowing. The insertion bevels 68 extend from the end face 63 in the direction of a front side 69 of the coupling element 61 or the mounting plate 61A.

The coupling recess 70 has a substantially cylindrical inner contour 71, wherein this inner contour 71 does not have to be completely cylindrical, but merely represents a so-to-speak enveloping inner contour. Thus, the pin section 91 is at least partially supported on the inner periphery of the coupling recess 70 with its likewise essentially cylindrical outer peripheral contour 86 so that the king pin 82 can essentially rotate about a joint rotational axis GZ relative to the towing vehicle coupling 60.

On an underside 74 of the coupling element 61 or the mounting plate 61A, a support body 72 is arranged. The support body 72 is provided next to and/or below the coupling recess 70. The support body 72 may be plate-like. The king pin 82 is to be inserted past the support body 72 into the coupling recess 70 when the trailer coupling 80 is coupled to the towing vehicle coupling 60.

The trailer coupling 80 can be locked on the towing vehicle coupling 60 by a locking device 75 of the towing vehicle coupling 60. The locking device 75 comprises a locking body 76, which engages in a locking recess 87 of the pin 82, which is provided on the outer periphery 86 thereof.

The pin 82 can be easily inserted into the coupling recess 70 in that, by way of example, on its end face 88, i.e. on the side of the pin 82 opposite the flange body 84, a slide bevel 89 is present. The slide bevel 89 is provided, by way of example, by a rounded or conical edge section between the outer periphery 86 and the end face 88 or end surface of the pin 82.

The locking body 76 is expediently driven by a manual or motorised locking drive 77, so that it engages in its locking position into the locking recess 87 and is moved out of the locking recess 87 in its release position, so that the pin 82 can be moved out of the coupling recess 70.

The trailer coupling 80 can rotate with respect to the towing vehicle coupling 60 preferably about the joint rotational axis GZ, i.e. about a rotational axis which is generally vertical in driving mode, but also joint rotational axes GX and GY, i.e. about a longitudinal axis and a transverse axis, which extend in particular in the vehicle longitudinal direction of the towing vehicle Z or orthogonally at right angles to the vehicle longitudinal direction of the towing vehicle Z.

When the trailer coupling 80 is coupled to the towing vehicle coupling 60, the coupling mating element 81 can pivot relative to the coupling member 61 with respect to the joint axes GX, GY and GZ, so that the coupling element 61 and the coupling mating element 81 form a joint 95. The coupling mating element 81 and the coupling element 61 are in engagement with each other in a bearing region 96. The bearing region 96 is preferably approximately cylindrical.

By way of example, when cornering, the trailer vehicle A may pivot relative to the towing vehicle Z substantially about the joint axis GZ. However, the trailer vehicle A can also pivot or rotate relative to the towing vehicle Z during a rolling motion or rolling movement about the joint rotational axis GX and/or during a pitching movement about the joint rotational axis GY.

In all these cases, it is possible to determine a pivoting or rotation of the trailer vehicle A relative to the towing vehicle Z about the joint rotational axis GZ, namely by means of a sensor device 10.

The sensor device 10 is accommodated in a receiving space 67 below the coupling recess 70. The receiving space 67 is a receiving space already present in a standard fifth-wheel coupling 60A, meaning that a structural modification is unnecessary.

The sensor device 10 is provided for rotational drive by the coupling mating element 81, which has a follower surface 90 for this purpose. The follower surface 90 is formed by way of example by the end face 88 or provided thereon. However, the slide bevel 89 or any other region of the outer peripheral contour 86 can form the follower surface 90 wholly or partially, as will become clearer.

The sensor device 10 has a follower 20, which can be rotated by the coupling mating element 81, namely the pin or king pin 82, and about a follower rotational axis M.

The follower 20 has a follower surface 21 for producing a follower contact or a follower connection with the pin 82. The follower surface 21 is provided on a free end face of the follower 20. A peripheral wall 22 extends away from the follower surface 21 and, by way of example, runs substantially conically or cylindrically.

The follower surface 21 is provided on an end wall 21A, which is designed essentially as a plane or flat wall. The peripheral wall 22 extends away from the end wall 21A.

The sensor device 10 comprises a sensor 11, by way of example a magnetic sensor. Signals generated by the sensor 11 are evaluated by an evaluation device 12, which includes, by way of example, a processor 13 and a memory 14. The processor 13 executes program code from at least one program which processes the sensor signals of the sensor 11 and provides them, by way of example, to an interface 15, in particular a bus coupler, for a vehicle electrical system N of the towing vehicle Z. The interface 15 is, by way of example, a CAN bus interface, but may also easily be or include another digital or analogue interface.

The follower 20 is mounted so that it is rotatable about the follower rotational axis M on a bearing body 30. The bearing body 30 comprises for example a cylindrical protective housing 29 in which a rotational axis body 31 is rotatably mounted on one or a plurality of rotary bearings 32. A section of the rotational axis body 31 protruding from the protective housing 29 is connected to the follower 20 in a rotationally fixed manner. Thus, the follower 20 can rotate relative to the bearing body 30 about the follower rotational axis M.

One or a plurality of sensor transmitters 25, for example magnets, are connected to the rotational axis body 31 in a rotationally stable manner, which serve to excite the sensor 11.

The follower 20 is movably mounted with respect to the coupling element 61, in particular the coupling recess 70, by a holding device 40.

The follower 20 can be deflected by degrees of freedom of rotation DX and DY and/or linear degrees of freedom of movement LX, LY and LZ from its central position. The pivoting degrees of freedom or rotational degrees of freedom DX, DY are orthogonal to the follower rotational axis M and orthogonal to each other. By way of example, the follower 20 may pivot with the degree of freedom of rotation DX about an axis SX which is parallel to the joint rotational axis GX. During deflection or displacement with the linear degree of freedom of movement LX, the follower 20 can be deflected linearly about the axis SX parallel to the joint rotational axis GX, i.e. moved at right angles to the follower rotational axis M.

The further linear degree of freedom of movement LY permits a deflection or displacement of the follower 20 transversely to the degree of freedom of movement LX or to the X axis and/or along an axis SY which is parallel to the rotational axis GY. When rotated by the degree of freedom of rotation DY the follower 20 rotates about this axis SY parallel to the joint rotational axis GY.

The displaceability with the degree of freedom LZ is provided parallel or coaxially to the follower rotational axis M.

All of the aforementioned degrees of freedom of rotation DX, DY or linear degrees of freedom of movement LX, LY or LZ make it possible for the follower 20 to be deflected out of its central position when the trailer coupling 80 is coupled to the towing vehicle coupling 60, by way of example, so that its end wall 21A on the end face 88 or the support surface or follower surface of the pin 82 comes to rest flat and parallel. In addition, the rotational follower coupling of the follower 20 is also possible with a deflection transverse to the follower rotational axis M. Thus, by way of example, the follower 20 pivots by the degree of freedom of rotation DX or DY, but still remains in follower contact with the pin 82.

In a transition region or edge region between the end wall 21A and the peripheral wall 22, an inclined surface or insertion bevel is preferably provided onto which the coupling mating element 81 can slide when coupling to the coupling element 61, i.e. when inserted into the coupling recess 70, for example. In this case, the coupling element 61 can, by way of example, tilt or pivot the follower 20 transversely to the follower rotational axis M and/or adjust it along the follower rotational axis M.

The mobility of the follower 20 by the degrees of freedom of movement DX, DY, LX, LY and LZ is provided by the holding device 40, on which the bearing body 30 is arranged in a fixed, i.e. immovable, manner.

The holding device 40 holds the bearing body 30 non-rotatably in relation to the follower rotational axis M, but allows movements of the bearing body 30 and thus also of the follower 20 by the degrees of freedom of movement DX, DY as well as the translational degrees of freedom of movement or linear degrees of freedom of movement LX, LY and LZ.

The holding device 40 comprises a pivot bearing 41, which comprises a bearing base 42 that is fixed relative to the towing vehicle coupling 60. The bearing blocks are for example penetrated by an axle body 43, on which a pivot body 44 is pivotably mounted. For example, the axle body 43 is pivotably mounted on the pivot body 44 and/or the bearing base 42.

A further pivot bearing 45 is provided on the pivot body 44. The pivot axes R1Y and R2Y of the pivot bearings 41, 45 run parallel to one another. Consequently, the longitudinal axes of the axle bodies 43, 46 are parallel to one another.

The pivot bearing 45 is used for pivotable mounting of two joint rods 47, which protrude from the pivot body 44 in the direction of the bearing body 30 and hold the bearing body 30.

The joint rods 47 carry an axle body 48, which supports a carrier 35 of the holding device 40, on which the bearing body 30 is arranged, so as to be pivotable about a pivot axis which corresponds to the pivot degree of freedom DY. Thus, the bearing body 30 can pivot about the pivot axis DY, but is held in a rotationally fixed manner by the carrier 35 in relation to the follower rotational axis M. To provide the further degrees of freedom of movement LX, LY and LZ, the joint rods 47 are connected in a ball joint to the axle bodies 46 and 48, namely on the basis of ball joints 47A, 47B, 47C and 47D. The ball joints 47A-47D allow further rotational degrees of freedom of movement or pivoting degrees of freedom R2X, R3X, R4X, R5X as well as R2Z, R3Z, R4Z and R5Z.

At this point, however, it should be noted that, for example, a cardanic articulated bearing would also be possible instead of the ball joints 47A-47D.

The joint rods 47 and the axle bodies 46, 48 define with their pivot joints, namely the ball joints 47A-47D at their connecting areas, a four-joint link 147 and/or a joint parallelogram.

It should also be mentioned that the pivot bearing 45 and a pivot bearing 49, which includes the axle body 48, are sufficient for the pivoting degrees of freedom or rotation degrees of freedom DY and R2Y. In addition, it is possible for the pivot bearings 45, 49 to allow a displaceability and thus a translational degree of freedom of movement. If, for example, the axle bodies 46, 48 are displaceable relative to the component on which they are arranged in a rotatable manner, namely relative to the pivot body 44 and relative to the carrier 35, translational degrees of freedom of movement LY can thus be easily realised.

The pivot bearings 41, 45, 49 form a pivot bearing arrangement 141, allowing a translational movement or a translational degree of freedom of movement of the follower 20, namely the degree of freedom of movement LX. The follower 20 is thus pivotably mounted only by means of pivot bearings 41, 45, 49, in order to realise a translational degree of freedom of movement. The pivot axes of the pivot bearings 41, 45, 49 are parallel to one another.

The translational degree of freedom of movement LY is also realised exclusively by pivot bearings, namely by the ball joints 47A-47D.

It should be mentioned at this point, however, that the magnetic measuring principles or sensor principles of the sensor device 10 are not the only embodiment. In a sensor device according to the invention, by way of example, inductive, capacitive or optical sensors, also in combination, may be provided. By way of example, instead of the sensor transmitters 25, designed as magnets, optical markings, in particular lines or similar, can be provided, which can be detected by an optical sensor 11. Capacitive detection is also easily possible if, by way of example, corresponding electric fields are provided by the sensor transmitters.

Instead of sensor transmitters 25, other sensor elements or sensors may also be provided. Thus, the sensory detection of a relative position of a follower relative to a carrier or bearing body can also be realised by at least one sensor, which is arranged on the follower and thus rotates relative to the bearing body or carrier about the follower rotational axis.

The followers 20, may be wholly or partly made of an elastic material, by way of example a flexible plastic, rubber or similar. An elastic resilience in the region of the follower surface 21 is particularly advantageous.

The end wall 21A is preferably designed as a frictional engagement surface or has a frictional engagement surface. For example, corundum, quartz, rock particles or the like are provided on the frictional engagement surface with sharp breaking edges and in any case tips or the like.

The follower 20 preferably has a magnet 23 or another magnet arrangement for providing a magnetic attractive force acting on the follower 20 in the direction of the coupling mating element 81. It is possible for the follower 20 as a whole to be formed by the magnet 23 or for the magnet 23 to be embedded in a main body of the follower 20.

Additionally possible, but not shown in the drawing, is a cushioning of the follower 20 is in a direction away from the bearing body 30 and/or in the direction of the coupling mating element 81.

In a follower position, the follower 20 is in follower contact with the coupling mating element 81. In a release position, on the other hand, the follower 20 is removed from the coupling mating element 81 such that the coupling mating element 81 cannot take the follower 20 with it. The release position is provided in particular for coupling the trailer coupling 80 to the towing vehicle coupling 60, while the follower position of the follower 20 is set when the coupling mating element 81 engages with the coupling element 61, i.e. is coupled.

An actuator 50 is provided for adjusting the follower 20 between the follower position and the release position. The actuator 50 comprises positioning element 51, for example adjusting arms or fork arms, which are pivotably mounted on a pivot bearing 52. The pivot bearing 52 is for example arranged next to the pivot body 44. The pivot arms or adjusting arms of the positioning elements 51 run in a fork-like manner laterally next to the joint rods 47 and can, so to speak, engage the bearing body 30 to lift it in the direction of the coupling mating element 81.

The pivot bearing 52 comprises a bearing base 52A, which for example comprises one or a plurality of bearing blocks, on which a bearing axis element 52B is held. The positioning elements 51, i.e. the adjusting arms, are connected to the bearing axis element 52B with bearing ends, for example rotatably connected. It is also possible for the bearing axis element 52B to be pivotably mounted on the bearing base 52A.

A spring arrangement 53 loads the positioning elements 52 in the direction of the follower position of the follower 20, i.e. for example vertically upwards. The spring arrangement 53 comprises a spring 53A, which is for example supported on the bearing base 52A or a body supporting the bearing base 52A and is also supported on a support body 53B, which extends between the positioning elements 51 or the adjusting arms.

The carrier 35 has legs 36, 37 between which the bearing body 30 is held. The pivot bearing 49 is provided on the leg furthest away from the follower 20, i.e. in the drawing the lower leg 36. The leg 36 also forms a coupling section for coupling the actuator 50. Drive bodies 38, 39 are arranged on the leg 36. The drive body 38 forms a support drive body, so to speak, which is provided for support on the positioning elements 51. Recesses or follower recesses 51A are provided on the positioning elements 51 for the drive body 38, into which the drive body 38 can engage when the controlling bodies 58 lift the carrier 35 in the direction of the coupling mating element 81.

The drive body 39 forms, so to speak, a traction drive body for the actuator 50, by means of which the actuator 50 can move, in particular pull, the carrier 35 away from the coupling mating element 81 in the direction of the release position.

The drive bodies 38, 39 are for example designed in the manner of support rods or support elements. The drive body 38 projects on opposite sides in front of the leg 36 in the direction of the positioning elements 51. The drive body 38 protrudes, for example, in the direction of the spring arrangement 52 into an intermediate space between the positioning elements 51.

The actuator 50 comprises a drive train 55 with an electric drive motor 55A, which drives an output 55C via a gearbox 55B. The drive motor 55A can be moved in opposite directions, oscillating back and forth. The output 55C is for example designed in the manner of an output shaft. The output 55C is rotatably mounted and supported on a support 55D at a distance from the gearbox 55B.

The output 55C drives a cable traction gear or belt transmission 58. The belt gear 58 comprises traction elements 58A and 58B, each of which is connected to the output 55C. At the other longitudinal end, the traction element 58A is connected to the traction drive body 39, and the traction element 58B is connected to one or both positioning elements 51.

If the traction element 58B is wound up onto the output 55C, the traction element 58B exerts a tensile force on the at least one positioning element 51 such that it is actuated in the direction of the release position contrary to the force of the spring arrangement 53.

However, if the traction element 58B is unwound from the output 55C, it releases the positioning elements 51, so to speak, so that the spring arrangement 53 can adjust the positioning elements 51 in the direction of the follower position, so that ultimately the carrier 35 and thus the follower 20 are moved into the follower position.

To adjust the follower 20 and the bearing body 30 from the follower position to the release position, i.e. away from the coupling mating element 81, the output 55C rotates in such a way that it winds up the traction element 58A, simultaneously unwinding the traction element 58B so that it actuates the carrier 35 and thus the bearing body 30 from the follower position in the direction of the release position. In addition, the carrier 35 acts on the positioning elements 51 via the support drive bodies 38 in a sense a direction from the follower position to the release position.

It is advantageous for the actuator 50 to be able to adjust the follower 20 between the follower position and the release position, even if the coupling mating element 81 is engaged with the coupling element 61. A control device 56 is provided to control the actuator 50.

The control device 56 is for example a microprocessor controller, wherein an analogue controller, for example comprising logical switching elements, would also be easily possible. A processor 56A and a memory 56B of the control device are internally connected to one another, wherein at least one control program 56C stored in memory 56B can be executed by the processor 56A such that it performs the functions explained below.

An input/output interface 56D of the control device 56 serves for communication with for example the actuator 50, in particular the servo motor or drive motor 55A, as well as with a sensor 57.

For example, the sensor 57 detects a position of the coupling element 81 relative to the coupling element 61 in order to determine in this way that the coupling mating element 81 engages with the coupling element 61, namely in a coupling position. However, it is also possible for the sensor 57, for example, to detect a position of the locking body 76, for example its closing position. For example, when the locking body 76 is moved from its release position to its locking position, the control device 56 can then move the follower 20 and the bearing body 30 from the release position to the follower position. However, when the locking body 76 is moved from its locking position in the direction of a release position provided for uncoupling the trailer A, the control device 56 actuates the drive motor 55A for adjustment from the follower position to the release position.

However, it would also be easily possible, for example, for the locking drive 77 to be coupled with the control device 56, i.e. this signals by means of a signal line not represented in the drawing whether the locking drive 77 is actuated from the locking position to the release position or vice versa.

In an actuator 150, the bearing body 30 and thus also the follower 20 is loaded by a spring arrangement 155 in the direction of the follower position. A spring 155A is for example supported on a vehicle-mounted support 155B, for example the support body 72, and loads the bearing body 30 in the direction of the coupling mating element 81. A latching recess 156D is provided on the bearing body 30 in which a latching body 156B engages with a latching projection 156C. The latching body 156B forms a component of a latching device 156A, which simultaneously represents a control device 156 for the actuator 150.

If the coupling mating element 81 is brought into engagement with the coupling element 61, the coupling mating element actuates the locking device 156 in a position releasing the actuator 150 in which it actuates the follower 20 from the release position to the follower position. For example, the coupling mating element 81, in particular its flange body 84, glides along an actuating surface or actuating bevel 156E, as a result of which the latching body 1566 is brought out of engagement with the latching recess 156D. Preferably, the latching body 156B is loaded by means of a spring 156F into the locking position, i.e. the engagement position of the locking projection 156C in the latching recess 156D. The spring 156F is, for example, securely supported on a support 156G relative to the towing vehicle coupling 60.

The invention claimed is:

1. A sensor device for a towing vehicle coupling or forming part of a towing vehicle coupling with which a trailer vehicle is configured to be coupled to a towing vehicle wherein the towing vehicle coupling has a coupling element for releasably coupling a coupling mating element, which elements are securable to the towing vehicle and the trailer vehicle, and when coupled can rotate relative to each another about at least one joint rotational axis, forming a joint, wherein the sensor device has a follower which is mounted on a bearing body such that it can rotate relative to the coupling element about a follower rotational axis and can be rotatably carried about the follower rotational axis by the rotation of the coupling mating element about the at least one joint rotational axis in order to sense a rotation of the coupling mating element relative to the coupling element about the at least one joint rotational axis, and wherein the sensor device has at least one sensor for sensing a respective rotational position of the follower relative to the bearing body in relation to the follower rotational axis, wherein the follower is mounted, with a degree of translatory freedom of movement achieved by a pivot bearing arrangement, for movement in relation to the coupling element, in order to provide or maintain the coupling of the follower relative to the coupling mating element, wherein for said movement the follower pivots about at least one pivot axis with said degree of translatory freedom of movement.

2. The sensor device according to claim 1, wherein the follower pivots about at least two pivot axes of the pivot bearing arrangement, for the adjustment and/or during the adjustment with the translational degree of freedom of movement.

3. The sensor device according to claim 2, characterised wherein at least two pivot axes of the pivot bearing arrangement are parallel pivot axes to provide the translational degree of freedom of movement to one another.

4. The sensor device according to claim 1, wherein the follower is adjusted during adjustment with the translational freedom of movement along a longitudinal axis, wherein the longitudinal axis runs transversely to the at least one pivot axis of the pivot bearing arrangement.

5. The sensor device according to claim 1, wherein the translational degree of freedom of movement is a linear degree of freedom of movement.

6. The sensor device according to claim 5, wherein the linear degree of freedom of movement comprises at least one linear movement component parallel to the follower rotational axis or runs parallel to the follower rotational axis.

7. The sensor device according to claim 1, wherein the follower is mounted exclusively by means of pivot bearings so as to move relative to the coupling mating element, wherein at least two pivot bearings are provided.

8. The sensor device according to any one of the preceding claim 1, wherein the pivot bearing arrangement comprises at least one pivot bearing pivoting only about an axis of rotation and/or at least one pivoting joint pivoting on several axes.

9. The sensor device according to claim 1, wherein the follower is movably mounted relative to the coupling mating element by at least one four-joint link and/or a joint parallel diagram.

10. The sensor device according to claim 1, further comprising a magnet arrangement with at least one magnet providing a magnetic attraction force exerted on the follower in the direction of the coupling element, wherein the follower is held exclusively or substantially by the at least one magnet when using the sensor device on the coupling element and the sensor and/or the bearing body is held on the coupling mating element by the magnet.

11. The sensor device according to claim 1, wherein the bearing body is movably mounted with three translational or linear degrees of freedom of movement at an angle to one another as well as with two degrees of freedom of movement relative to the coupling element that differ from the rotatability about the follower rotational axis and is rotationally fixed relative to the follower rotational axis relative to the coupling element.

12. The sensor device according to claim 1, further comprising an actuator for adjusting at least the follower between a follower position moved closer to the coupling mating element and a release position further away from the coupling mating element, wherein the actuator can be actuated by a control device for adjusting the follower.

13. The sensor device according to claim 12, wherein the control device for actuating the actuator moves the follower between the release position and the follower position when the coupling element is engaged with the coupling mating element.

14. The sensor device according to claim 12, wherein the follower is applied in the follower position in contact with the coupling mating element and in the release position except in contact with the coupling mating element or with less force in the direction of the coupling mating element than in the follower position.

15. The sensor device according to claim 12 wherein the actuator has a positioning element comprising one adjusting arm for adjusting the follower and/or the bearing body between the follower position and the release position.

16. The sensor device according to claim 15, wherein the positioning element is adjustable after the adjustment of the follower or the bearing body to a rest position away from the follower or the bearing body, in which the positioning element does not impede movement of the follower or the bearing body.

17. The sensor device according to claim 12, wherein the actuator comprises or is formed by an electric drive motor and/or a fluid drive and/or a spring drive and/or in that the actuator permanently loads the follower and/or the bearing body by a spring arrangement in the direction of the follower position.

18. The sensor device according claim 12, wherein the control device comprises a latching device or is formed by a latching device, which activates the actuator by actuation for the adjustment of at least the follower between the follower position and the release position.

19. The sensor device according to claim 12, wherein the control device comprises or is formed by an electrical control device for actuating the actuator and/or in that the control device has at least one sensor, wherein the control device actuates the actuator by a sensor signal from the at least one sensor.

20. The sensor device according to claim 12, wherein the actuator adjusts the bearing body held on the holding device between the release position and the follower position.

21. The sensor device according to claim 1, wherein the follower is mounted such that it moves relative to the coupling element for providing or maintaining a follower coupling to the coupling mating element with a plurality of degrees of freedom of movement different from the rotatability about the follower rotational axis.

22. The sensor device according to claim 21, wherein at least one degree of freedom of movement different from the rotatability about the follower rotational axis comprises at least one degree of freedom of rotation and/or at least one linear degree of freedom of movement and/or in that the follower is mounted so as to displace relative to the coupling element along at least one displacement axis or linear axis.

23. The sensor device according to claim 1, further comprising a holding device for holding the bearing body against rotation with respect to the follower rotational axis on the coupling element.

24. The sensor device according to claim 22, wherein the holding device supports the bearing body with at least one degree of freedom of movement suitable for providing or maintaining the follower coupling of the follower to the coupling mating element, which is different from the rotatability about the follower rotational axis, with respect to the coupling element.

25. The sensor device according to claim 1, wherein the follower comprises an end face penetrated by the follower rotational axis, which is provided for following, by the coupling mating element.

26. The sensor device according to claim 25, wherein the end face of the follower is a flat surface.

27. The sensor device according to claim 25, wherein the end face of the follower and a follower surface lie flat against one another on a front side of the coupling element in the follower position.

28. The sensor device according to claim 25, wherein the end face of the follower in the follower position is arranged for contact on a follower surface, which is provided on a front side of the coupling mating element opposite the follower, and is exclusively in contact with such surface sections with the follower surface, the normal direction of which is parallel to the follower rotational axis.

29. The sensor device according claim 1, wherein the follower has an end face penetrated by the follower rotational axis, which is provided for following, exclusively in a frictional and/or magnetic manner, by a follower surface on a front side of the coupling mating element.

30. The sensor device according to claim 1, wherein an end face of the follower penetrated by the follower rotational axis comprises at least one ring or is formed by the ring.

31. The sensor device according to claim 1, wherein the follower is designed for frictional rotational following by the coupling mating element and/or has no positive-locking contour for rotational following by the coupling mating element and/or has frictional engagement surfaces for friction-locking following by the coupling element.

32. The sensor device according to claim 1, further comprising a force-applying mechanism that applies force to the follower in the direction of the coupling mating element.

33. Sensor device according to claim 1, further comprising a magnet arrangement with at least one magnet for providing a magnetic attraction force impinging on the follower in the direction of the coupling mating element.

34. The sensor device according to claim 1, characterised in that the or further comprising a magnet arrangement configured for actuating or exciting the at least one sensor and/or further comprising a screening device for screening the at least one sensor against magnetic influences of the magnet arrangement.

35. The sensor device according to claim 1, wherein at least one frictional engagement surface for a frictional contact with the coupling mating element and/or at least one positive locking contour for a positive engagement of the coupling mating element and the follower is arranged on the follower.

36. The sensor device according to claim 1, wherein the towing vehicle coupling is a fifth wheel coupling and the coupling element has a coupling receptacle for receiving a king pin of the coupling mating element or that the coupling element has a coupling ball or a coupling projection for engagement in a coupling receptacle of the coupling mating element.

37. The sensor device according to claim 1, wherein the joint rotational axis and the follower rotational axis are coaxial and/or aligned with one another when the coupling element and the coupling mating element are coupled to one another.

38. A towing vehicle coupling with a sensor device according to claim 1.

* * * * *